(12) United States Patent
Kim et al.

(10) Patent No.: US 11,635,137 B2
(45) Date of Patent: Apr. 25, 2023

(54) APPARATUS AND METHOD FOR DIAGNOSING AUTOMATIC TRANSMISSION

(71) Applicants: HYUNDAI MOTOR COMPANY, Seoul (KR); KIA CORPORATION, Seoul (KR)

(72) Inventors: Si Wook Kim, Yongin-si (KR); Jin Ill Kim, Seoul (KR); Jaeho Chun, Paju-si (KR); Min-Gu Jeon, Suwon-si (KR); Do Hwan Ahn, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/544,232

(22) Filed: Dec. 7, 2021

(65) Prior Publication Data
US 2022/0390008 A1 Dec. 8, 2022

(30) Foreign Application Priority Data
Jun. 4, 2021 (KR) .......................... 10-2021-0072833

(51) Int. Cl.
*F16H 61/04* (2006.01)
*F16H 61/14* (2006.01)
(Continued)

(52) U.S. Cl.
CPC ....... *F16H 61/143* (2013.01); *F16H 61/0213* (2013.01); *F16H 61/04* (2013.01);
(Continued)

(58) Field of Classification Search
CPC .... F16H 61/143; F16H 61/0213; F16H 61/04; F16H 2061/0096; F16H 2061/1216
See application file for complete search history.

(56) References Cited

U.S. PATENT DOCUMENTS 4,835,694 A * 5/1989 Yamamoto ............ F16H 61/143
477/906
5,846,162 A * 12/1998 Ito .......................... F16H 61/12
477/143

(Continued)

FOREIGN PATENT DOCUMENTS

| JP | 1999-236964 A | 8/1999 |
| KR | 10-0791787 B1 | 1/2008 |
| KR | 10-2009-0113452 A | 11/2009 |

*Primary Examiner* — Huan Le
(74) *Attorney, Agent, or Firm* — McDonnell Boehnen Hulbert & Berghoff LLP (57) ABSTRACT

An apparatus for diagnosing an automatic transmission for detecting abnormality during driving of a vehicle includes a G-sensor configured to measure a vibration signal including a longitudinal vibration signal, a status detection unit configured to obtain the vibration signal of the G-sensor and status data of transmission and engine sensors of the vehicle, and a controller configured to check an operational element for each shifting operation by using a current shift-stage, a target shift-stage, and a shifting time detected as the status data, measure the longitudinal vibration signal of the G-sensor to calculate fluctuation level of the longitudinal vibration signal for each operational element, and determine a shift shock event when a longitudinal vibration signal value after adjustment based on driving acceleration of the vehicle exceeds a reference value.

17 Claims, 8 Drawing Sheets

(51) Int. Cl.
  *F16H 61/02* (2006.01)
  *F16H 61/00* (2006.01)
  *F16H 61/12* (2010.01)

(52) U.S. Cl.
  CPC ............... *F16H 2061/0096* (2013.01); *F16H 2061/1216* (2013.01)

(56) References Cited

U.S. PATENT DOCUMENTS

| | | | |
|---|---|---|---|
| 6,871,133 B2* | 3/2005 | Togai | B60K 26/04 |
| | | | 701/111 |
| 8,771,145 B2* | 7/2014 | Kim | F16H 61/688 |
| | | | 477/80 |
| 11,274,744 B2* | 3/2022 | Fujii | F16H 61/0437 |

* cited by examiner

| Driving and determining mode | Content (repeated by 3 times) |
|---|---|
| Static shift-feel | In a static state, P-R-N-D-N-R-P |
| Low and medium speed acceleration | Shifting from D1 up to D6 / APS 3~35% condition |
| Low and medium speed deceleration | Shifting from D6 down to D1 / weak braking condition deceleration |
| High speed acceleration | Shifting from D6 up to D8 / APS 3~35% condition |
| High speed deceleration | Shifting from D8 down to D6 / weak braking condition deceleration |

APPARATUS AND METHOD FOR DIAGNOSING AUTOMATIC TRANSMISSION

CROSS-REFERENCE TO RELATED APPLICATION

This application claims priority to and the benefit of Korean Patent Application No. 10-2021-0072833 filed in the Korean Intellectual Property Office on Jun. 4, 2021, the entire contents of which are incorporated herein by reference.

BACKGROUND

(a) Field

The present disclosure relates to an apparatus and method for diagnosing an automatic transmission.

(b) Description of the Related Art

In general, an automatic transmission (A/T) of a vehicle automatically shifts a speed ratio according to an engine rotational speed (e.g., RPM), a vehicle speed, and a vehicle load.

The automatic transmission includes a torque converter and operation elements for multi-speed shifting, and is hydraulically operated under the control of a transmission control unit (TCU).

In the event of an abnormal operation (abnormality) such as shift shock, the automatic transmissions may be replaced, resulting in excessive quality maintenance costs. Accordingly, there is a demand to reduce the cost of maintaining quality through partial repair, which partially replaces the parts causing the malfunction.

However, it is difficult to identify the malfunction-causing part, e.g., due to the lack of skills of the mechanic, and the difficulty of the maintenance service is raised due to the absence of a standard for determining the abnormality, i.e., malfunctioning, of the automatic transmission.

For example, it is difficult to check the current shift stage and the shift period while the vehicle is driving, and it is difficult to identify the operation elements of the hydraulic system for each shifting operation.

In addition, there is no criterion for determining whether the transmission is malfunctioning, such as shift shock or juddering, so it is difficult to determine the operation abnormality or to identify the malfunction-causing parts.

The above information disclosed in this Background section is only for enhancement of understanding of the background of the disclosure, and therefore it may contain information that does not form the prior art that is already known in this country to a person of ordinary skill in the art.

SUMMARY

An embodiment provides an apparatus and method for diagnosing an automatic transmission capable of determining an abnormal operation of an automatic transmission and a part causing the abnormality during driving of a vehicle, by using status data of a G-sensor and transmission/engine sensors.

An apparatus for diagnosing an automatic transmission of a vehicle according to an embodiment is an apparatus attachable to the vehicle to detect abnormality of an operational element of the automatic transmission during driving of the vehicle, and the apparatus includes a G-sensor configured to measure a vibration signal including a longitudinal vibration signal, a status detection unit configured to obtain, during driving of the vehicle, the vibration signal of the G-sensor according to time and status data of a transmission sensor and an engine sensor of the vehicle according to time through a diagnosis communication, and a controller configured to check the operational element of the automatic transmission for each shifting operation by using a current shift-stage, a target shift-stage, and a shifting time detected as the status data of the transmission sensor, measure the longitudinal vibration signal of the G-sensor during the driving of the vehicle to calculate fluctuation level of the longitudinal vibration signal according to time for each operational element, and determine a shift shock event when a value of a longitudinal vibration signal of the G-sensor after adjustment based on driving acceleration of the vehicle exceeds a reference value.

The controller is further configured to identify a shifting range for each shifting operation by using the current shift-stage, the target shift-stage, and the shifting time.

The controller is further configured to identify a shift-start time point and a shift-finish time point according to the shifting range and check the operational element for each shifting operation corresponding to each time point.

The controller is further configured to determine a solenoid valve and a valve body of a shift-stage corresponding to a shifting range determined as the shift shock event as a replacement-required part.

The controller is further configured to determine a shifting delay event when the shifting time elapsed from the shift-start time point to the shift-finish time point exceeds a preset value.

The controller is further configured to filter the longitudinal vibration signal such that may be excluded from consideration in determining the shift shock event.

The controller is further configured to compare difference between an engine speed and a turbine speed based on the status data to identify operation status of a damper clutch, and determine a damper clutch impact event when the damper clutch enters a lock-up state and an impact exceeding the reference value occurs.

The controller is further configured to determine an operational element of corresponding time point as a replacement-required part when at least one of the shift shock event, a shifting delay event, and a damper clutch impact event is determined.

The controller is further configured to display the determined event and the replacement-required part causing the determined event through a display unit.

A method for diagnosing an automatic transmission of a vehicle according to an embodiment includes, detecting a vibration signal of a G-sensor, status data of a transmission sensor and an engine sensor according to time through a diagnosis communication with the vehicle during driving of the vehicle, checking an operational element of the automatic transmission for each shifting operation by using a current shift-stage, a target shift-stage, and a shifting time detected as the status data of the transmission sensor, measuring a longitudinal vibration signal of the G-sensor to calculate fluctuation level of the longitudinal vibration signal according to time for each operational element during the driving of the vehicle, and determining a shift shock event when a value of a longitudinal vibration signal of the G-sensor after adjustment based on driving acceleration of the vehicle exceeds a reference value.

Checking the operational element may include identifying a shifting range for each shifting operation by using the current shift-stage, the target shift-stage, and the shifting time.

Checking the operational element may include identifying a shift-start time point and a shift-finish time point according to the shifting range and checking the operational element for each shifting operation corresponding to each time point.

A method for diagnosing an automatic transmission of a vehicle according to an embodiment may further include, between the measuring the longitudinal vibration signal and the determining whether the shift shock event occurs, measuring a vertical vibration signal of the G-sensor, and filtering the longitudinal vibration signal such that a longitudinal vibration signal occurring immediately after detecting a road impact based on the vertical vibration signal is excluded.

Determining the shift shock event may include determining a shifting delay event when the shifting time elapsed from the shift-start time point to the shift-finish time point exceeds a preset value.

Determining the shift shock event may include comparing difference between an engine speed and a turbine speed based on the status data to identify operation status of a damper clutch, and determining a damper clutch impact event when the damper clutch enters a lock-up state and an impact exceeding the reference value occurs.

A method for diagnosing an automatic transmission of a vehicle according to an embodiment may further include, after the determining the shift shock event, determining an operational element of corresponding time point as a replacement-required part when at least one of the shift shock event, a shifting delay event, and a damper clutch impact event is determined, and displaying the determined event and the replacement-required part causing the determined event through a display unit.

An apparatus for diagnosing an automatic transmission according to an embodiment may be installed to a vehicle to detect abnormality of an operational element of the automatic transmission during driving of the vehicle, and the apparatus includes a G-sensor configured to measure a vertical a vibration signal and a longitudinal vibration signal during driving of the vehicle, a transmission sensor configured to measure status data of the automatic transmission, and a controller configured to check the operational element of the automatic transmission by using a current shift-stage, a target shift-stage, and a shifting time detected as the status data of the transmission sensor, measure the longitudinal vibration signal of the G-sensor during the driving of the vehicle to calculate fluctuation level of the longitudinal vibration signal according to time for each operational element, and determine a shift shock event when a longitudinal vibration signal value of the G-sensor after adjustment based on driving acceleration of the vehicle exceeds a reference value.

According to an embodiment, an abnormal operation of an automatic transmission, such as the shift shock, the shifting delay, and the damper clutch shock for each shifting range may be determined during driving of the vehicle, by using status data of a G-sensor and transmission/engine sensors.

In addition, an operational element causing the abnormality may be identified as a replacement-required part, and thus, a quality maintaining cost may be reduced by partially repairing the identified replacement-required part.

In addition, customer's complaints on the automatic transmission and various sensor data and event results collected by the automatic transmission diagnosis may be accumulated to form a database, and maintenance reliability may be improved by utilizing the database to reproducing evaluation.

DETAILED DESCRIPTION OF THE EMBODIMENTS

In the following detailed description, only certain embodiments of the present disclosure have been shown and described, simply by way of illustration.

The terminology used herein is for the purpose of describing particular embodiments only and is not intended to be limiting of the present disclosure. As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any one or all combinations of one or more related items.

It is understood that the term "vehicle," "vehicular," "car," or other similar term as used herein is inclusive of motor vehicles, in general, such as passenger automobiles including sports utility vehicles (SUVs), buses, trucks, various commercial vehicles, watercraft including a variety of boats and ships, aircraft, and the like.

Throughout the specification, terms such as first, second, "A", "B", "(a)", "(b)", and the like will be used only to describe various elements, and are not to be interpreted as limiting these elements. These terms are only for distinguishing the constituent elements from other constituent elements, and nature or order of the constituent elements is not limited by the term.

In this specification, it is to be understood that when one component is referred to as being "connected" or "coupled" to another component, it may be connected or coupled directly to the other component or be connected or coupled to the other component with a further component intervening therebetween. In this specification, it is to be understood that when one component is referred to as being "connected or coupled directly" to another component, it may be connected to or coupled to the other component without another component intervening therebetween.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, devices, or the like, as described herein. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Hereinafter, an apparatus and method for diagnosing an automatic transmission according to an embodiment is described in detail with reference to the drawings.

Figure 1:
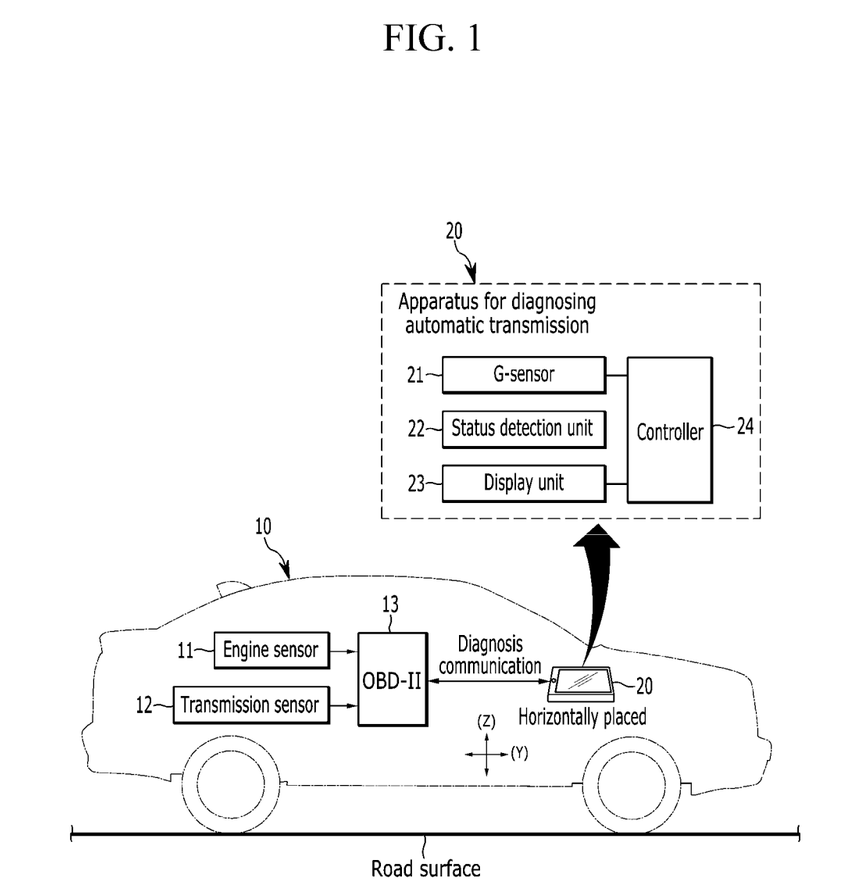
FIG. 1 schematically illustrates a vehicle and an apparatus for diagnosing an automatic transmission according to an embodiment.

FIG. 1 schematically illustrates a vehicle and an apparatus for diagnosing an automatic transmission according to an embodiment.

Referring to FIG. 1, an apparatus 20 for diagnosing an automatic transmission for detecting abnormality (i.e., malfunctioning) of an operational element of an automatic transmission during driving of the vehicle is attached to a vehicle 10.

The vehicle 10 includes an engine sensor 11, a transmission sensor 12, and an OBD-II 13, as well known in the art.

The engine sensor 11 measures status data including an engine speed during driving of the vehicle 10, and transfers the measured data to the OBD-II 13.

The transmission sensor 12 measures status data including a current shift-stage and a target shift-stage according to shifting of the automatic transmission, and transfers the measured data to the OBD-II 13. Here, the automatic transmission is used in a wide meaning to include a transmission having an operational element that is operated for shifting and may be an object of diagnosis, such as an automated manual transmission (AMT), a dual clutch transmission (DCT), and the like.

In addition, the transmission sensor 12 detects a turbine rotation speed (hereinafter, referred to as a turbine speed) of the automatic transmission as the status data, and transfers the detected data to the OBD-II 13.

The OBD-II 13 is connected, through diagnosis communication, to the apparatus 20 for diagnosing the automatic transmission attached for maintenance or driving evaluation of the vehicle 10. In addition, during the driving of the vehicle 10, the status data measured by the engine sensor 11 and the transmission sensor 12 are transmitted to the apparatus 20 for diagnosing the automatic transmission through diagnosis communication.

The diagnosis communication may be dedicated or general communication between the OBD-II 13 and the apparatus 20 in wired or wireless communication scheme.

The apparatus 20 for diagnosing the automatic transmission according to an embodiment may be temporarily attached to the vehicle 10, to detect the abnormal operation (i.e., abnormality) of the automatic transmission and/or the abnormality of an operational element of the automatic transmission, during the driving of the vehicle 10.

The operational element subject to the diagnosis according to an embodiment may include operational elements operated for shifting of the automatic transmission and the damper clutch provided in the automatic transmission.

The abnormality of the automatic transmission may include a shifting delay of the automatic transmission.

The apparatus 20 for diagnosing the automatic transmission includes a G-sensor 21, a status detection unit 22, a display unit 23, and a controller 24. The apparatus 20 for diagnosing the automatic transmission may be realized, for example, by implementing corresponding functions to a portable diagnosis terminal or a portable information communication terminal (for example, a tablet PC, or the like) used for vehicle maintenance in a vehicle manufacturing factory, a repair shop, and the like.

The G-sensor 21 is configured to measure a vibration signal according to acceleration of the vehicle 10 during the driving of the vehicle. The vibration signal of the G-sensor 21 includes a vertical vibration signal Z according to vertical direction vibration of the vehicle 10 and a longitudinal vibration signal Y according to back-and-forth vibration.

The status detection unit 22 is configured to detect, according to time, a vibration signal of the G-sensor 21 according to time and the status data of the transmission sensor 12 and the engine sensor 11 through diagnosis communication connected to the vehicle 10, during driving of the vehicle.

The display unit 23 displays information such as menus and result data for operation of the apparatus 20 for diagnosing the automatic transmission to the user. The display unit 23 may display various events determined by the diagnosis of the automatic transmission by the controller 24, the cause of the event occurrence, and a replacement-required part causing the event, to the user.

The controller 24 may store various program and data for an overall operation of the apparatus 20 for diagnosing the automatic transmission, and also store data generated by the operation of the apparatus 20.

The controller 24 is configured to check an operational element of the automatic transmission for each shifting operation by using the current shift-stage, the target shift-stage, and a shifting time detected as the status data of the transmission sensor 12, measure the longitudinal vibration signal Y of the G-sensor 21 during driving to calculate fluctuation level of the longitudinal vibration signal according to time for each operational element, and determine a shift shock event when a value of the longitudinal vibration signal Y of the G-sensor 21 after adjustment based on driving acceleration of the vehicle.

The adjustment of the vibration signal of the G-sensor 21 may refer to scaling of the directly measured value with reference to the vehicle driving acceleration, considering the fact that average vibrate level may depend on the vehicle acceleration.

The controller 24 is configured to, during the driving of the vehicle 10, detect abnormality such as a shift shock, the shifting delay, and a damper clutch shock, by using the status data of the G-sensor 21, the transmission, and the engine, identify an operational element causing abnormality, and suggest a replacement-required part.

For this purpose, the controller 24 may be implemented with at least one processor operated by a predetermined program, and the predetermined program may be programmed to perform each step of a method for diagnosing the automatic transmission according to an embodiment.

Hereinafter, a method for diagnosing the automatic transmission is described in detail with reference to the drawings.

Figure 2:
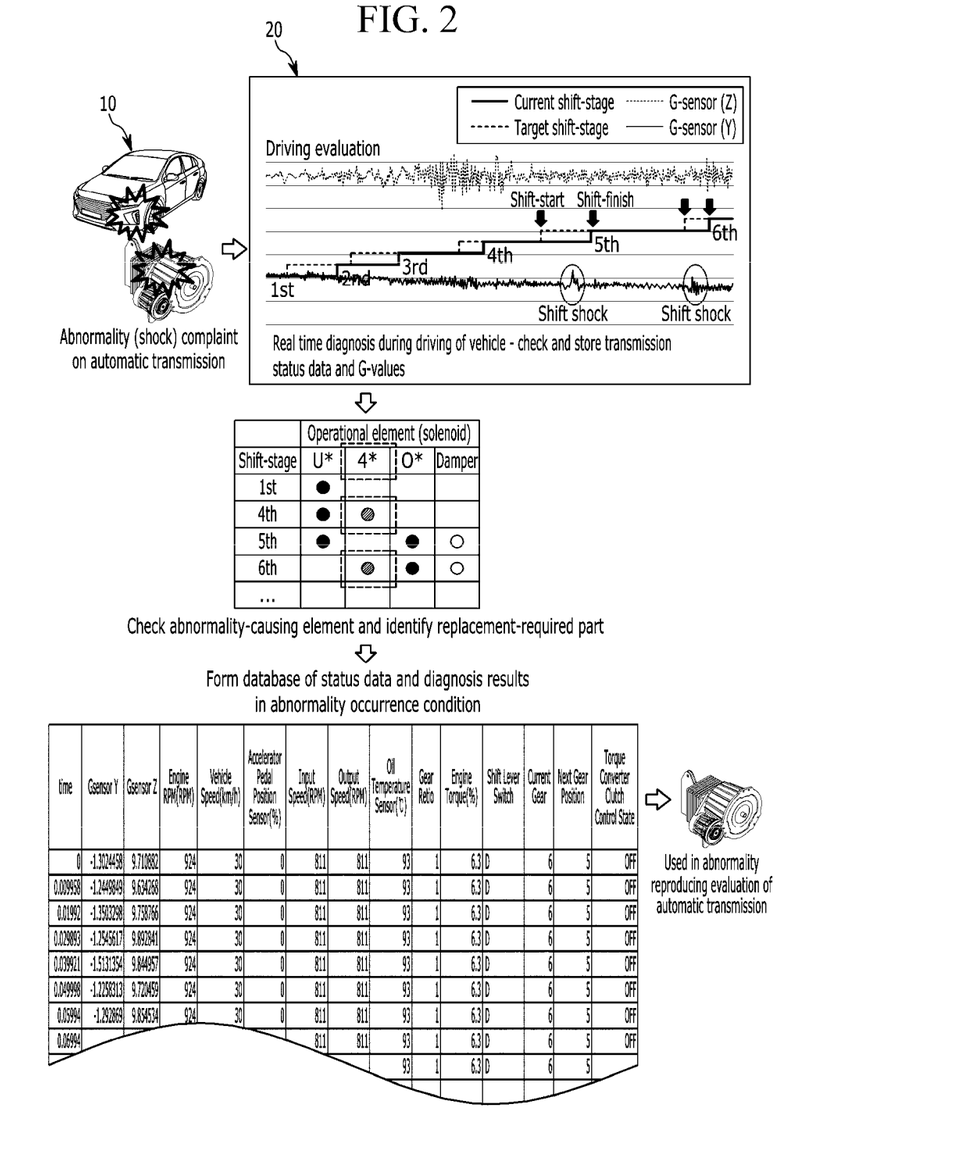
FIG. 2 illustrates an entire scenario for explaining a method for diagnosing an automatic transmission according to an embodiment.

FIG. 2 illustrates an entire scenario for explaining a method for diagnosing the automatic transmission according to an embodiment.

Referring to FIG. 2, according to a method for diagnosing the automatic transmission according to an embodiment, when the vehicle 10 subject to inspection/diagnosis of the automatic transmission is received in a factory or a repair shop, the apparatus 20 for diagnosing the automatic transmission is attached to the vehicle 10. An embodiment is described in a scenario in which abnormality of the operational element of the automatic transmission diagnosed through driving evaluation, i.e., during driving of the vehicle. At this time, the apparatus 20 for diagnosing the automatic transmission may be attached to the vehicle 10 at a position where that apparatus 20 may be horizontally positioned for measurement of the vertical vibration signal Z and the longitudinal vibration signal Y of the G-sensor 21, e.g., by being Velcro-fastened to a floor at a bottom of a passenger seat.

Figure 3:
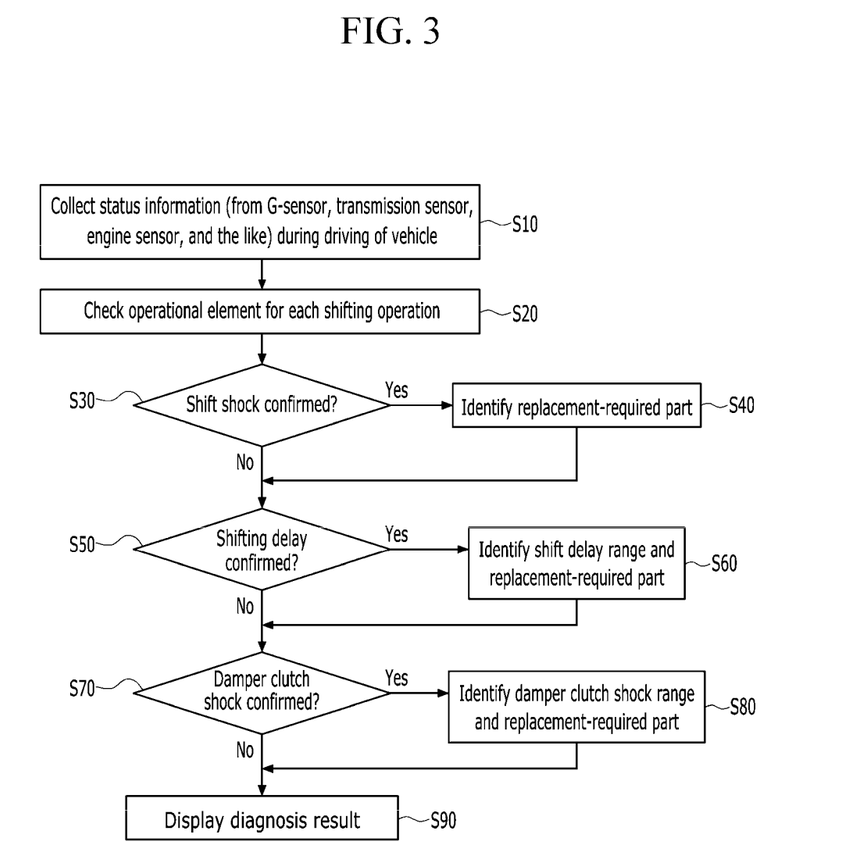
FIG. 3 is a flowchart showing a method for diagnosing an automatic transmission according to an embodiment.

FIG. 3 is a flowchart showing a method for diagnosing the automatic transmission according to an embodiment.

Specifically, FIG. 3 illustrates a method for diagnosing the automatic transmission performed during the driving of the vehicle 10 by the apparatus 20 for diagnosing the automatic transmission attached to the vehicle as such, to detect the abnormality of the operational element of the automatic transmission.

During the driving of the vehicle 10, at step S10, the controller 24 detects the vibration signals Z and Y of the G-sensor 21, the status data of the transmission sensor 12 and the engine sensor 11 of the vehicle according to time, through the status detection unit 22 in the diagnosis communication with the OBD-II 13.

Figure 4:
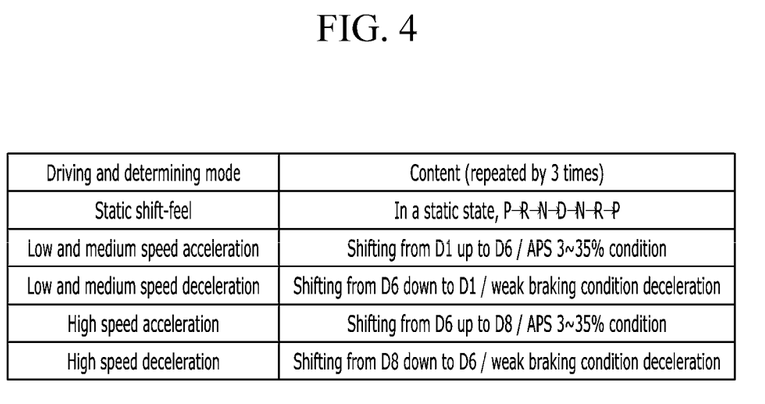
FIG. 4 shows a driving example for diagnosing an automatic transmission according to an embodiment.

For example, FIG. 4 shows a driving example for diagnosing the automatic transmission according to an embodiment.

Referring to FIG. 4, a test-driver shifts shift-stages of the vehicle 10 and according to a preset strategy for driving evaluation while driving the vehicle 10 at various vehicle speeds and driving conditions, such that the automatic transmission automatically shifts the shift-stages according to the driving conditions such as low and medium speed acceleration, low and medium speed deceleration, high-speed acceleration, high speed deceleration, and the like.

For example, while the vehicle is static, the test driver shifts the automatic transmission between parking P, reverse R, neutral N, and drive D gears, according to the indicated sequence of P, R, N, D, N, R, P.

While driving the vehicle in a low and medium vehicle speed, the test driver shifts the automatic transmission among relatively low and medium shift-stages. For example, the automatic transmission is automatically shifted from the first shift-stage D1 up to the sixth shift-stage D6 by accelerating with accelerator position sensor value of 3% to 35%, and from the sixth shift-stage D6 down to the first shift-stage D1 by decelerating in a weak braking condition.

While driving the vehicle in a high vehicle speed, the test driver shifts the automatic transmission among relatively high shift-stages. For example, the automatic transmission is automatically shifted from the sixth shift-stage D6 up to the eighth shift-stage D8 by accelerating with accelerator position sensor value of 3% to 35%, and from the eighth shift-stage D8 down to the sixth shift-stage D6 by decelerating in a weak braking condition.

Details and/or detailed ranges of the low and medium vehicle speed, high vehicle speed, low and medium shift-stages, and high shift-stages may be preset according to design factors, and the present disclosure is not limited thereto.

As shown in FIG. 4, driving of the vehicle includes shifting the automatic transmission while the vehicle is static. Thus, it should be understood that, in this disclosure, "driving" of the vehicle does not necessarily mean that the vehicle is travelling, and may mean that the vehicle (specifically, the automatic transmission) is operated.

At step S20, the controller 24 checks the operational element of the automatic transmission for each shifting operation by using the current shift-stage, the target shift-stage, and the shifting time detected as the status data of the transmission sensor 12. At this time, while the test-driver drives the vehicle 10 at various driving conditions, the automatic transmission is diagnosed based on the current shift-stage, the target shift-stage, and the shifting time, and abnormality occurrence of the automatic transmission for each shifting operation may be diagnosed.

In addition, the controller 24 identifies a shifting range for each shifting operation by using the current shift-stage, the target shift-stage, and the shifting time. In addition, the controller 24 is configured to identify a shift-start time point and a shift-finish time point according to the shifting range and check the operational element for each shifting operation corresponding to each time point. The shifting range refers to a shifting operation through which the shift-stage of the automatic transmission is changed from the current shift stage to the target shift stage, e.g., from 1st to 2nd, from 2nd to 3rd, or the like.

In addition, abnormality occurrence for each operational element may be detected, and occurrence of the shift shock event, the shifting delay event and the damper clutch shock event may be determined as follows.

Figure 5:
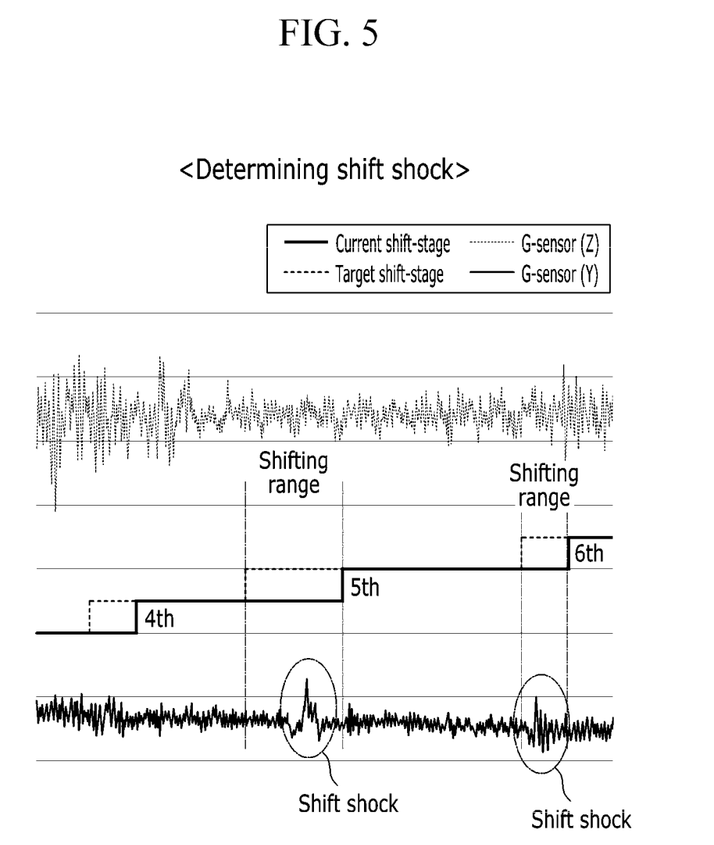
FIG. 5 shows a method for determining a shift shock according to an embodiment.

For example, FIG. 5 shows a method for determining the shift shock according to an embodiment.

At step S30, the controller 24 determines whether the shift shock event occurs. Referring to FIG. 5, at the step S30, the controller 24 determines that the shift shock event occurs when a value of the longitudinal vibration signal Y of the G-sensor 21 after adjustment based on driving acceleration of the vehicle 10 exceeds a reference value. At this time, the controller 24 measures the vertical vibration signal Z of the G-sensor 21, and filters the longitudinal vibration signal Y such that a longitudinal vibration signal Y occurring immediately after detecting a road impact based on a vertical vibration signal Z may be excluded from consideration in determining the shift shock event.

At step S40, the controller 24 checks a corresponding operational element causing the shift shock event, and identifies the replacement-required part. For example, the controller 24 may identify a solenoid valve and a valve body of an on-coming element and an off-going element corresponding to the shifting range determined as the shift shock event as the replacement-required part.

Figure 6:
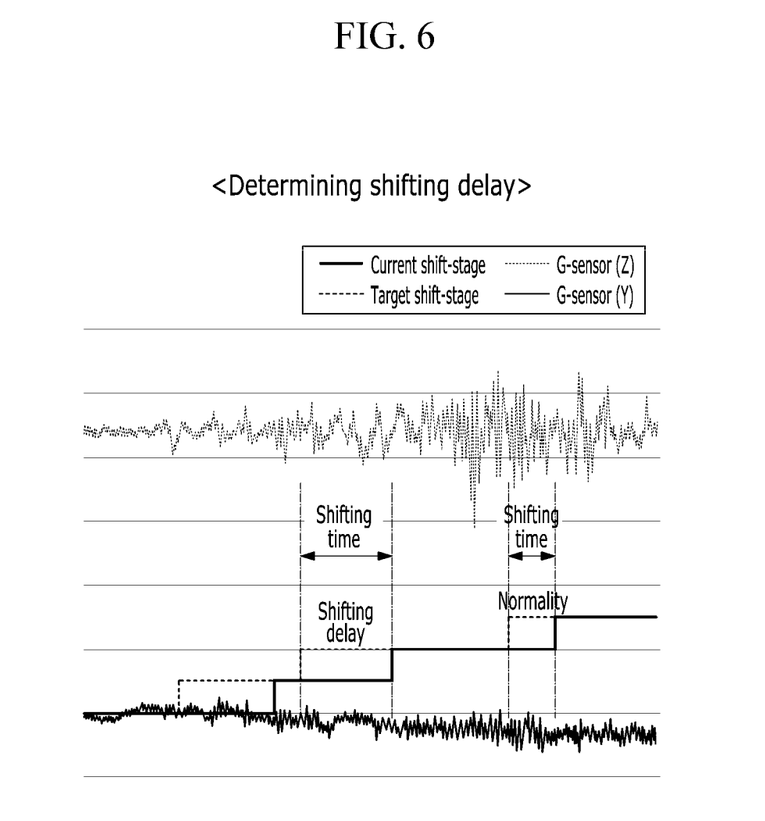
FIG. 6 shows a method for determining a shifting delay according to an embodiment.

Meanwhile, FIG. 6 shows a method for determining the shifting delay according to an embodiment.

At step S50, the controller 24 determines whether the shifting delay event occurs. Referring to FIG. 6, at the step 50, the controller 24 determines that the shifting delay event occurs when the shifting time elapsed from the shift-start time point to the shift-finish time point exceeds a preset value. At step S60, the controller 24 identifies a shifting delay range (i.e., a shifting range where the shifting delay occurs) and a corresponding operational element (i.e., an operational element causing the shifting delay). Here, the shifting time refers to a time period where the current shift-stage and the target shift-stage are different.

For example, the controller 24 may identify a solenoid valve and a valve body of an on-coming element and an off-going element corresponding to the shifting range determined as the shift delay event as the replacement-required part.

Figure 7:
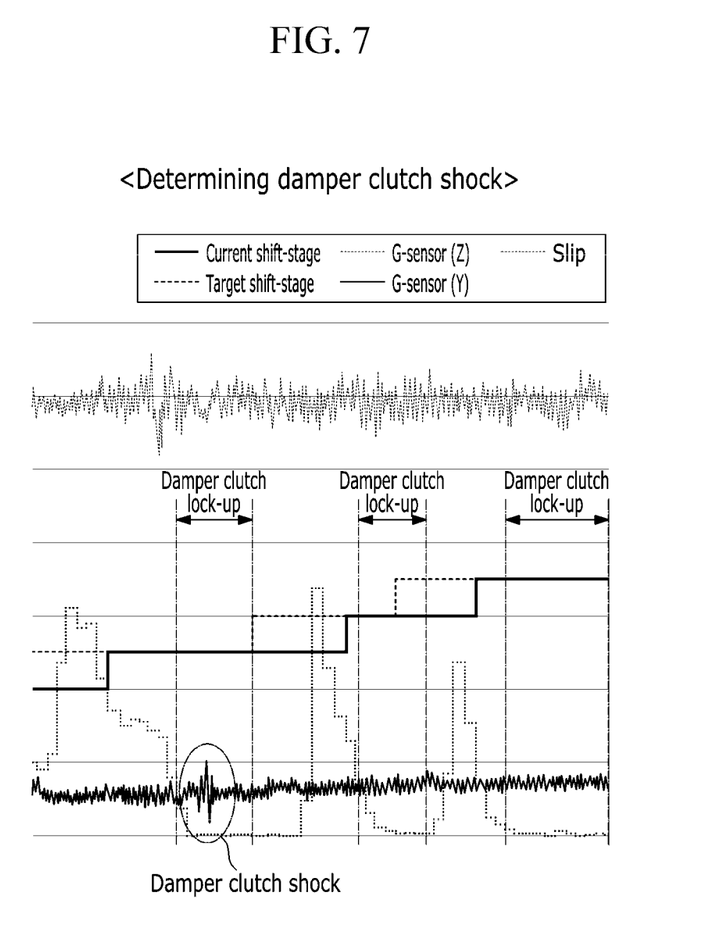
FIG. 7 shows a method for determining a damper clutch shock according to an embodiment.

Meanwhile, FIG. 7 shows a method for determining the damper clutch shock according to an embodiment.

At step S70, the controller 24 determines whether the damper clutch impact event occurs. Referring to FIG. 7, at the step S70, the controller 24 compares difference between the engine speed and the turbine speed based on the status data to identify operation status of the damper clutch. At step S80, the controller 24 the controller 24 identifies a damper clutch shock range (i.e., a shifting range where the damper clutch impact event occurs) and a corresponding operational element (i.e., an operational element causing the damper clutch impact event). Here, the lock-up range is a range where the engine speed equals the turbine speed.

For example, the controller 24 may identify a solenoid valve and a valve body of an on-coming element and an off-going element corresponding to the shifting range determined as the damper clutch shock event as the replacement-required part.

As such, the controller 24 may determine an operational element of a corresponding range as the replacement-required part when at least one of the shift shock event, the shifting delay event, and the damper clutch impact event is detected.

In addition, at step S90, at the controller 24 identifies the determined event and the replacement-required part causing the determined event, and displays the information to the user through the display unit 23.

For example, as shown in FIG. 5, when the event occurs while the shift-stage is changed from fourth-speed to fifth-speed, replacement of a fifth-speed on-coming solenoid valve and a fourth-speed off-going solenoid valve may be proposed. In the same way, when the event occurs while the shift-stage is changed from fifth-speed to sixth-speed, replacement of sixth-speed on-coming solenoid valve and fourth-speed off-going solenoid valve may be proposed.

In addition, when the event occurs while the damper clutch is operated to be locked up, replacement of a corresponding valve body assembly may be proposed.

As such, according to an embodiment, an abnormality of an automatic transmission, such as the shift shock, the shifting delay, and the damper clutch shock for each shifting range may be determined during driving of the vehicle, by using status data of a G-sensor and transmission/engine sensors.

In addition, an operational element causing the abnormality may be identified as a replacement-required part, and thus, a quality maintaining cost may be reduced by partially repairing the identified replacement-required part.

In addition, customer's complaints on the automatic transmission and various sensor data and event results collected by the automatic transmission diagnosis may be accumulated to form a database, and maintenance reliability may be improved by utilizing the database to reproducing evaluation.

It may be understood that the present disclosure is not limited to the above embodiment, and various modifications may be available.

For example, it has been described that, in an embodiment with reference to FIG. 1, the apparatus 20 for diagnosing the automatic transmission is originally detached from but attached for a real-time evaluation. However, the present disclosure is not limited thereto, and an apparatus for diagnosing the automatic transmission may be fixedly installed to a vehicle for a self-diagnosis.

Figure 8:
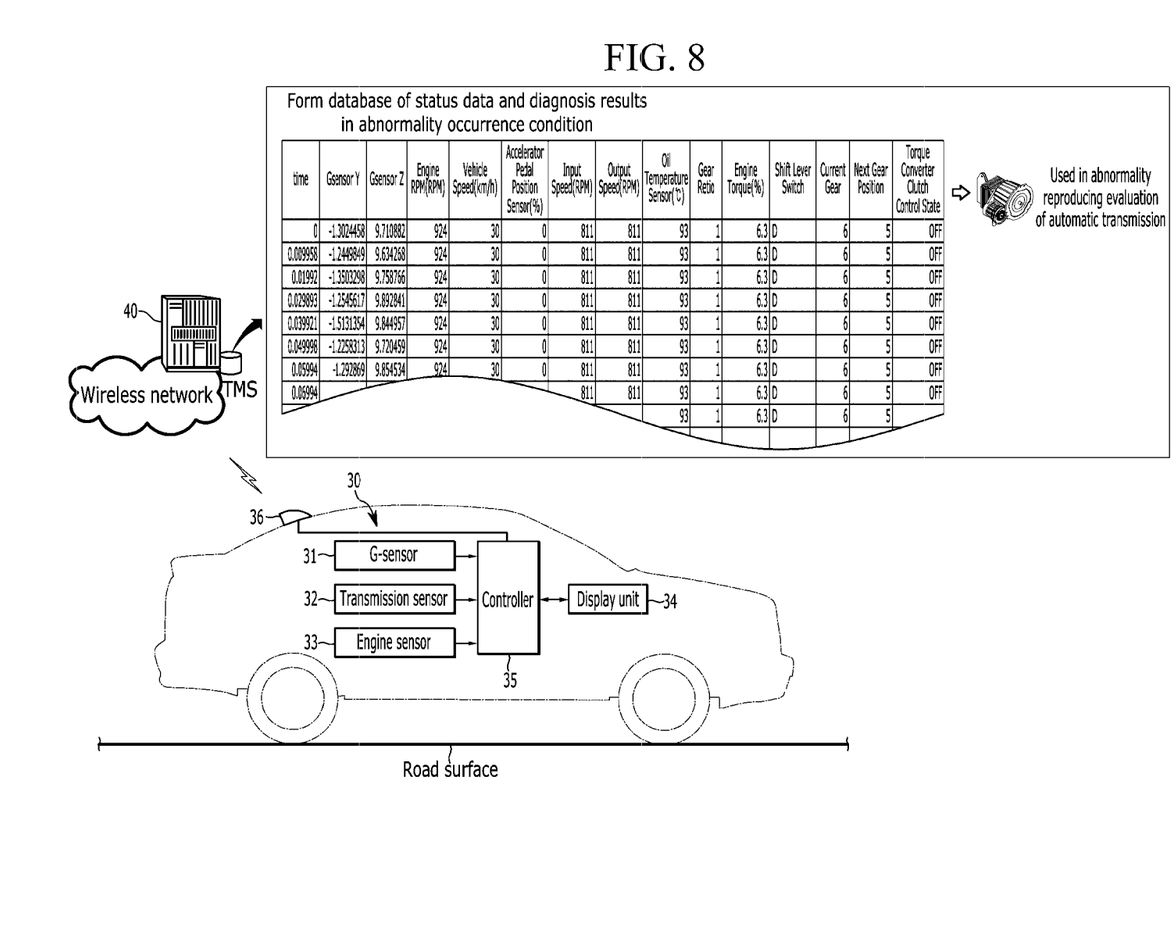
FIG. 8 schematically illustrates an apparatus for diagnosing an automatic transmission of a vehicle according to an additional embodiment of the present disclosure.

For example, FIG. 8 schematically illustrates an apparatus for diagnosing the automatic transmission of a vehicle according to an additional embodiment of the present disclosure.

Specifically, FIG. 8 illustrates an apparatus 30 for diagnosing the automatic transmission of a vehicle configured to diagnose abnormality of the operational element of the automatic transmission through a self-diagnosis during driving of the vehicle, and a telematics server (TMS) 40 connected to the apparatus 30 through a wireless network.

The apparatus 30 for diagnosing the automatic transmission of a vehicle includes the G-sensor 31 configured to measure the vertical vibration signal Z and the longitudinal vibration signal Y during the driving of the vehicle, a transmission sensor 32 configured to measure the status data of the automatic transmission, an engine sensor 33 configured to measure the status data of engine, and a controller 35 configured to check the operational element of the automatic transmission by using the current shift-stage, the target shift-stage, and the shifting time detected as the status data of the transmission sensor 32, measure the longitudinal vibration signal Y of the G-sensor 31 during the driving of the vehicle to calculate fluctuation level of vibration signal according to time for each operational element, and determine the shift shock event when a value of the longitudinal vibration signal Y of the G-sensor 31 after adjustment based on driving acceleration of the vehicle exceeds a reference value. Here, the apparatus 20 for diagnosing the automatic transmission may further include a display unit 34 and a wireless antenna 36, where the display unit 34 displays an information such as menus and result data for operation of the apparatus 20 for diagnosing the automatic transmission to the user.

Hereinafter, the apparatus 30 for diagnosing the automatic transmission of a vehicle is described focusing the difference from the apparatus 20 for diagnosing the automatic transmission.

The apparatus 30 for diagnosing the automatic transmission of a vehicle may be realized, for example, by implementing corresponding functions to an information communication terminal such as an audio video navigation (AVN) system or a cluster in the vehicle. Since being installed in the vehicle, the status detection unit 22 for the diagnosis communication described in the above embodiment for connection may not be separately required.

The G-sensor 31 may be realized as a sensor employed to support the advanced driver assistance system (ADAS) function of an existing vehicle.

During normal driving of the vehicle, the apparatus 30 for diagnosing the automatic transmission of a vehicle may detect at least one abnormality event among the shift shock event, the shifting delay event, and the damper clutch shock of the automatic transmission, through self-diagnosis. In addition, the apparatus 30 may identify an operational element causing the abnormality event, and may notify the identified element through the AVN or a display unit 34 of the cluster.

In addition, the apparatus 30 for diagnosing the automatic transmission of a vehicle may transmit the determined event and the replacement-required part causing the determined event to the TMS 40 through the wireless antenna 36.

Therefore, the TMS 40 may accumulate customer's complaints on the automatic transmission and various sensor data and event results collected the automatic transmission diagnosis to form a database, and utilize the database in managing customer vehicles and reproducing evaluation.

The embodiments of the present disclosure described above are not only implemented by the apparatus and the method, but may be implemented by a program for realizing functions corresponding to the configuration of the embodiments of the present disclosure or a recording medium on which the program is recorded.

While this disclosure has been described in connection with what is presently considered to be practical embodiments, it is to be understood that the disclosure is not limited to the disclosed embodiments. On the contrary, it is intended to cover various modifications and equivalent arrangements included within the spirit and scope of the appended claims.

What is claimed is:

1. An apparatus for diagnosing an automatic transmission of a vehicle, the apparatus being attachable to the vehicle to detect abnormality of an operational element of the automatic transmission during driving of the vehicle, the apparatus comprising:
   a G-sensor configured to measure a vibration signal including a longitudinal vibration signal;
   a status detection unit configured to obtain, during driving of the vehicle, the vibration signal of the G-sensor according to time and status data of a transmission sensor and an engine sensor of the vehicle according to time through a diagnosis communication; and
   a controller configured to check the operational element of the automatic transmission for each shifting operation by using a current shift-stage, a target shift-stage, and a shifting time detected as the status data of the transmission sensor, to measure the longitudinal vibration signal of the G-sensor during the driving of the vehicle to calculate fluctuation level of the longitudinal vibration signal according to time for the operational element, and to determine a shift shock event when a value of the longitudinal vibration signal of the G-sensor after adjustment based on driving acceleration of the vehicle exceeds a reference value.

2. The apparatus of claim 1, wherein the controller is further configured to identify a shifting range for each shifting operation by using the current shift-stage, the target shift-stage, and the shifting time.

3. The apparatus of claim 2, wherein the controller is further configured to identify a shift-start time point and a shift-finish time point according to the shifting range, and to check the operational element for each shifting operation corresponding to each time point.

4. The apparatus of claim 3, wherein the controller is further configured to determine a solenoid valve and a valve body of a shift-stage corresponding to a shifting range determined as the shift shock event as a replacement-required part.

5. The apparatus of claim 3, wherein the controller is further configured to determine a shifting delay event when the shifting time elapsed from the shift-start time point to the shift-finish time point exceeds a preset value.

6. The apparatus of claim 1, wherein the controller is further configured to filter the longitudinal vibration signal to be excluded from consideration in determining the shift shock event.

7. The apparatus of claim 1, wherein the controller is further configured to compare a difference between an engine speed and a turbine speed based on the status data to identify operation status of a damper clutch, and to determine a damper clutch impact event when the damper clutch enters a lock-up state and an impact exceeding the reference value occurs.

8. The apparatus of claim 1, wherein the controller is further configured to determine the operational element as a replacement-required part when at least one of the shift shock event, a shifting delay event, and a damper clutch impact event is determined while the operational element is operated.

9. The apparatus of claim 8, wherein the controller is further configured to display the determined event and the replacement-required part causing the determined event through a display unit.

10. A method for diagnosing an automatic transmission of a vehicle, the method comprising:
    detecting a vibration signal of a G-sensor, status data of a transmission sensor, and an engine sensor according to time through a diagnosis communication with the vehicle during driving of the vehicle;
    checking an operational element of the automatic transmission for each shifting operation by using a current shift-stage, a target shift-stage, and a shifting time detected as the status data of the transmission sensor;
    measuring a longitudinal vibration signal of the G-sensor to calculate a fluctuation level of the longitudinal vibration signal according to time for the operational element during the driving of the vehicle; and
    determining a shift shock event when a value of the longitudinal vibration signal of the G-sensor after adjustment based on driving acceleration of the vehicle exceeds a reference value.

11. The method of claim 10, wherein checking the operational element comprises:
    identifying a shifting range for each shifting operation by using the current shift-stage, the target shift-stage, and the shifting time.

12. The method of claim 11, wherein checking the operational element comprises:
    identifying a shift-start time point and a shift-finish time point according to the shifting range, and checking the operational element for each shifting operation corresponding to each time point.

13. The method of claim 12, wherein determining the shift shock event comprises:
    determining a shifting delay event when the shifting time elapsed from the shift-start time point to the shift-finish time point exceeds a preset value.

14. The method of claim 10, further comprising, between measuring the longitudinal vibration signal and determining whether the shift shock event occurs:
    measuring a vertical vibration signal of the G-sensor; and
    filtering the longitudinal vibration signal such that the longitudinal vibration signal excludes the vertical vibration signal occurring immediately after detecting a road impact.

15. The method of claim 10, wherein determining the shift shock event comprises:

comparing a difference between an engine speed and a turbine speed based on the status data to identify operation status of a damper clutch; and determining a damper clutch impact event when the damper clutch enters a lock-up state and an impact exceeding the reference value occurs.

16. The method of claim 10, further comprising, after the determining the shift shock event:

determining the operational element as a replacement-required part when at least one of the shift shock event, a shifting delay event, and a damper clutch impact event is determined while the operational element is operated; and displaying the determined event and the replacement-required part causing the determined event via a display unit.

17. An apparatus for diagnosing an automatic transmission, the apparatus being installed in a vehicle to detect abnormality of an operational element of the automatic transmission during driving of the vehicle, the apparatus comprising:

a G-sensor configured to measure a vertical vibration signal and a longitudinal vibration signal during driving of the vehicle;

a transmission sensor configured to measure status data of the automatic transmission; and a controller configured to check the operational element of the automatic transmission by using a current shift-stage, a target shift-stage, and a shifting time detected as the status data of the transmission sensor, to measure the longitudinal vibration signal of the G-sensor during the driving of the vehicle to calculate a fluctuation level of the longitudinal vibration signal according to time for the operational element, and to determine a shift shock event when a longitudinal vibration signal value of the G-sensor after adjustment based on driving acceleration of the vehicle exceeds a reference value.

* * * * *